(12) United States Patent
Kuprionas

(10) Patent No.: US 6,948,168 B1
(45) Date of Patent: Sep. 20, 2005

(54) LICENSED APPLICATION INSTALLER

(75) Inventor: Paul Kuprionas, Nanticoke, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,859

(22) Filed: Mar. 30, 2000

(51) Int. Cl.$^7$ ............................................. G06F 9/445

(52) U.S. Cl. ...................... 717/178; 709/218; 709/219; 709/242; 709/249; 710/8; 710/52

(58) Field of Search ........ 717/168–178; 709/200–250; 710/8, 52

(56) References Cited

U.S. PATENT DOCUMENTS

| | | | |
|---|---|---|---|
| 4,953,209 A | | 8/1990 | Ryder, Sr. et al. |
| 5,005,122 A | | 4/1991 | Griffin et al. |
| 5,138,712 A | * | 8/1992 | Corbin ........................ 717/176 |
| 5,337,357 A | | 8/1994 | Chou et al. |
| 5,421,009 A | | 5/1995 | Platt |
| 5,638,513 A | | 6/1997 | Ananda |
| 5,666,501 A | | 9/1997 | Jones et al. |
| 5,708,709 A | | 1/1998 | Rose |
| 5,835,911 A | | 11/1998 | Nakagawa et al. |
| 5,864,620 A | | 1/1999 | Pettitt |
| 5,881,236 A | * | 3/1999 | Dickey ........................ 717/168 |
| 5,903,650 A | | 5/1999 | Ross et al. |
| 5,905,860 A | | 5/1999 | Olsen et al. |
| 5,919,247 A | | 7/1999 | Van Hoff et al. |
| 5,953,532 A | * | 9/1999 | Lochbaum ................... 717/176 |
| 6,056,786 A | * | 5/2000 | Rivera et al. ................ 717/168 |
| 6,189,146 B1 | * | 2/2001 | Misra et al. .................. 717/177 |
| 6,202,209 B1 | * | 3/2001 | Bartholomew .............. 717/168 |
| 6,493,871 B1 | * | 12/2002 | McGuire et al. ............ 717/173 |

FOREIGN PATENT DOCUMENTS

| | | |
|---|---|---|
| EP | 0 841 615 A2 | 5/1998 |
| JP | 04-100148 | 4/1992 |
| JP | 08-190529 | 7/1996 |
| JP | 09069044 A | 3/1997 |
| JP | 10040098 A | 2/1998 |
| JP | 10143357 A | 5/1998 |
| JP | 10-283270 | 10/1998 |
| JP | 11-024918 | 1/1999 |
| JP | 11-110209 | 4/1999 |
| JP | 11-238038 | 8/1999 |

* cited by examiner

*Primary Examiner*—Tuan Dam
*Assistant Examiner*—Chuck Kendall
(74) *Attorney, Agent, or Firm*—DeLio & Peterson, LLC; Kelly M. Reynolds; James J. Cioffi

(57) ABSTRACT

A method and system of installing licensed software on an end user's computer comprising having a program storage device and a unique computer identifier distinguishing the end user computer from other computers, e.g., a BIOS serial number or a network adapter address. The network computer contains a plurality of different software for license to end users and a database listing computer identifiers licensed to run the software. The end user computer sends to the network computer a command to run a program identifying to the end user computer the software listed as licensed by the computer identifier of the end user computer. The network computer contacts the end user computer and determine its end user computer identifier, verifies listing of the end user computer identifier in the network computer database, and identifies to the end user computer all of the software on the network computer program storage device listed as licensed by the computer identifier of the end user computer using an executable program on the network computer. The end user computer sends to the network computer a selection of the software to be downloaded. The network computer downloads the selected software and installs it on the end user computer program storage device.

17 Claims, 4 Drawing Sheets

LICENSED APPLICATION INSTALLER

BACKGROUND OF THE INVENTION

1. Field of the Invention

This invention relates to computer software, and in particular to a method and system of installing licensed software directly from a network computer to an end user computer via the Internet or another network.

2. Description of Related Art

Traditionally, new computer software, such as programs intended for execution on an end user's personal computer, have been distributed on physical media such as diskettes or CD-ROMs directly to the end user, along with a license typically limiting use of the software to one computer. Installation programs included on the physical media permit the end user to easily install the software on the personal computer. However, this ease of use also permits installation of the software on any number of additional computers, notwithstanding any use restrictions in the original license.

Newer software distribution systems have utilized distribution from a network server. Even though a number of such systems attempt to control access to the software, some such systems have numerous deficiencies. The deficiencies include a lack of control of the installation media, lack of checks on the actual computer to which the software is to be installed, and non-standardized installations among the various end user computers.

Bearing in mind the problems and deficiencies of the prior art, it is therefore an object of the present invention to provide a method and system for managing distribution of licensed software.

It is another object of the present invention to provide a method and system for improving control over installation of licensed software on end users personal computers.

It is a further object of the present invention to provide a method and system for verifying the propriety of distributing licensed software to an end user computer.

It is another object of the present invention to provide a method and system which standardizes the installation of licensed software on end users personal computers.

It is yet another object of the present invention to provide a method and system for reducing the opportunity to improperly copy and distribute licensed software to unlicensed end user computers.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of installing licensed software on an end user's computer comprising providing an end user computer having a program storage device and a unique computer identifier distinguishing the end user computer from other computers, and providing a network computer having access to a program storage device containing software for license to end users and a program storage device containing a database listing computer identifiers licensed to run the software. Thereafter the method includes using the network computer to contact the end user computer and determine its end user computer identifier, verifying listing of the end user computer identifier in the network computer database, downloading the software from the network computer, and installing the downloaded software on the end user computer program storage device.

On installation on the end user computer program storage device, the software comprises a program for execution on the end user computer. Preferably, the unique computer identifier is selected from the group consisting of a BIOS serial number and a network adapter address. The method may be practiced such that the network computer includes a plurality of different software and, prior to downloading the software, further includes identifying to the end user computer all of the software on the network computer program storage device listed as licensed by the computer identifier of the end user computer and sending from the end user computer to the network computer a selection of the software to be downloaded.

Preferably, the identification to the end user computer of all the software on the network computer program storage device listed as licensed by the computer identifier of the end user computer is by an executable program on a program storage device of the network computer. In such case, prior to identifying to the end user computer the software on the network computer program storage device, the method further includes sending to the network computer, from the end user computer a command to run the program identifying to the end user computer the software listed as licensed by the computer identifier of the end user computer. The program identifying to the end user computer the software listed as licensed by the computer identifier does not have to be installed on the end user computer. The method is especially useful where the end user computer program storage device contains a damaged version of the software to be downloaded, and wherein the installation of the software corrects the damaged software.

In another aspect, the present invention provides a method of installing licensed software on an end user's computer comprising providing an end user computer having a program storage device and a unique computer identifier distinguishing the end user computer from other computers, e.g., a BIOS serial number or a network adapter address, and providing a network computer having access to a program storage device containing a plurality of different executable software programs for license to end users, and a program storage device containing a database listing computer identifiers licensed to run the software. The method then comprises using the network computer to contact the end user computer and determine its end user computer identifier, verifying listing of the end user computer identifier in the network computer database, identifying to the end user computer all of the software on the network computer program storage device listed as licensed by the computer identifier of the end user computer, sending from the end user computer to the network computer a selection of the software to be downloaded, downloading the selected software from the network computer, and installing the downloaded software on the end user computer program storage device.

The identification to the end user computer of all the software on the network computer program storage device listed as licensed by the computer identifier of the end user computer may be by an executable program on a program storage device of the network computer. Prior to identifying to the end user computer the software on the network computer program storage device, the method may further include sending to the network computer, from the end user computer, a command to run the program identifying to the end user computer the software listed as licensed by the computer identifier of the end user computer.

In yet another aspect, the present invention provides a method of installing licensed software on an end user's computer comprising providing an end user computer having a program storage device containing a damaged executable software program and a unique computer identifier distinguishing the end user computer from other computers, such as a BIOS serial number or a network adapter address, and providing a network computer having access to a program storage device containing software for installing the executable software program and a program storage device containing a database listing computer identifiers licensed to run the software. The method further includes using the network computer to contact the end user computer and determine its end user computer identifier, verifying listing of the end user computer identifier in the network computer database, downloading the software from the network computer, and installing the downloaded software on the end user computer program storage device and correcting the damaged executable software program. The network computer may include a plurality of different software and, prior to downloading the software, so that the method further includes identifying to the end user computer all of the software on the network computer program storage device listed as licensed by the computer identifier of the end user computer and sending from the end user computer to the network computer a selection of the software to be downloaded. Preferably, the identification to the end user computer of all the software on the network computer program storage device listed as licensed by the computer identifier of the end user computer is by an executable program on a program storage device of the network computer. Prior to identifying to the end user computer the software on the network computer program storage device, the method may further include sending to the network computer, from the end user computer, a command to run the program identifying to the end user computer the software listed as licensed by the computer identifier of the end user computer.

In a related aspect, the present invention provides a program storage device readable by a machine, tangibly embodying a program of instructions executable by the machine to perform method steps for installing licensed software from a network computer to an end user's computer. The network computer has access to a program storage device containing software for license to end users and a program storage device containing a database listing computer identifiers licensed to run the software and the end user computer has a program storage device and a unique computer identifier distinguishing the end user computer from other computers. The method steps comprise contacting the end user computer using the network computer, determining the end user computer identifier, verifying listing of the end user computer identifier in the network computer database, downloading software from the network computer, and installing the downloaded software on the end user computer program storage device.

Another related aspect of the present invention provides a computer program product for use with a network computer and an end user's computer. The computer program product comprises a computer usable medium having computer readable program code means embodied in the medium for installing licensed software from the network computer to the end user's computer. The network computer has access to a program storage device containing software for license to end users, and a program storage device containing a database listing computer identifiers licensed to run the software and the end user computer has a program storage device and a unique computer identifier distinguishing the end user computer from other computers. The computer program product has computer readable program code means for contacting the end user computer using the network computer, computer readable program code means for determining the end user computer identifier, computer readable program code means for verifying listing of the end user computer identifier in the network computer database, computer readable program code means for downloading software from the network computer, and computer readable program code means for installing the downloaded software on the end user computer program storage device.

A further aspect of the present invention relates to an article of manufacture comprising: a computer usable medium having computer readable program code means embodied therein for installing licensed software from a network computer to an end user's computer. The network computer has access to a program storage device containing software for license to end users and a program storage device containing a database listing computer identifiers licensed to run the software and the end user computer has a program storage device and a unique computer identifier distinguishing the end user computer from other computers. The computer readable program code means in the article of manufacture comprises computer readable program code means for contacting the end user computer using the network computer, computer readable program code means for determining the end user computer identifier, computer readable program code means for verifying listing of the end user computer identifier in the network computer database, computer readable program code means for downloading software from the network computer, and computer readable program code means for installing the downloaded software on the end user computer program storage device.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
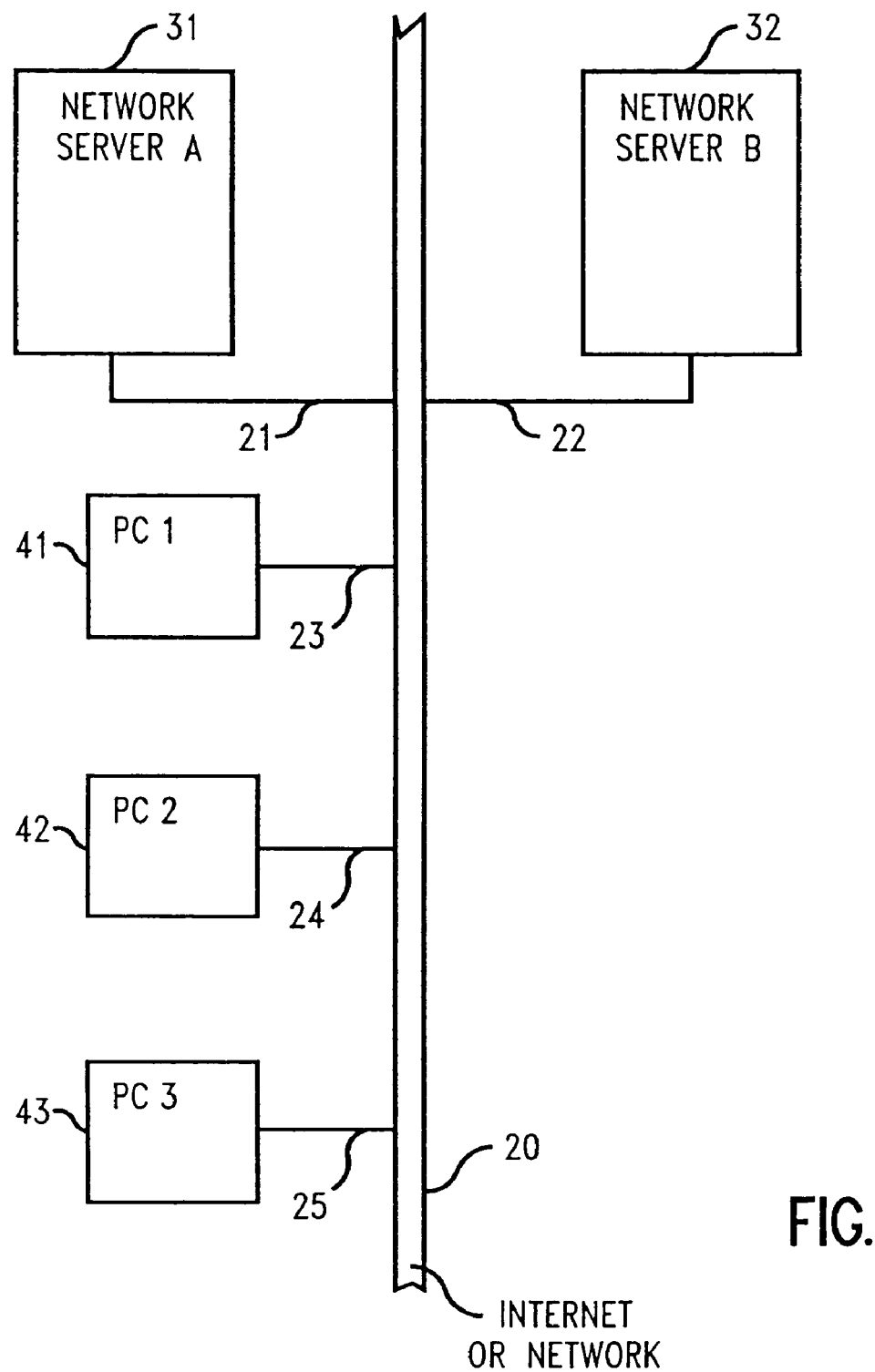
FIG. 1 is a schematic of the overall system of the present invention as run using a plurality of network servers connected to a plurality of end user personal computers by the Internet or a network.
Figure 2:
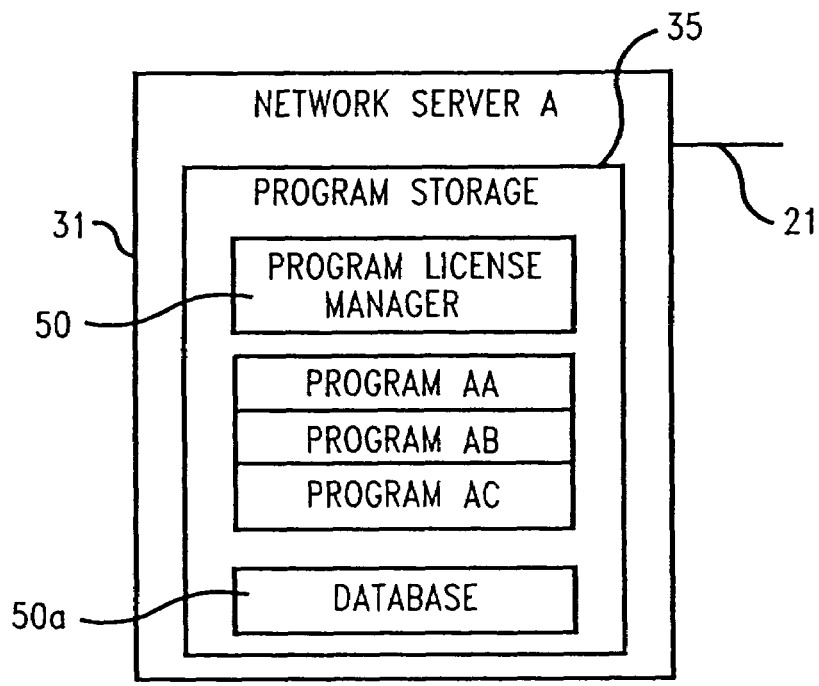
FIG. 2 is a schematic of the preferred network server of the present invention incorporating a program license manager program, individual available software programs and a database of licensed end user computer identifiers.

In describing the preferred embodiment of the present invention, reference will be made herein to FIGS. 1–5 of the drawings in which like numerals refer to like features of the invention. Features of the invention are not necessarily shown to scale in the drawings.

The present invention provides a method and system, in the form of a computer program product having source code storable on a program storage device, to install licensed software on a client or end user's personal computer by a scripted network installation routine and to verify that the end user has a valid license to install the software. The preferred method of determining a valid license is by uniquely identifying the client personal computer in use by the end user. A database on a network server or computer is maintained that matches the end user and a specific client personal computer. The personal computer can be uniquely identified by means of a BIOS (Basic Input Output System) serial number, network adapter address or other similar identifier supplied with the personal computer adapter by the manufacturer. The identities of the end user, i.e., the uniquely identified personal computer, and the licensed software programs or applications that the end user is legally able to install are all maintained in this central data base on (or accessed by) the network server. The exact data base structure may be selected in accordance with the requirements of the system. A relational data base is preferred, but a simple flat-file can be utilized as well as any other known data base structure.

It is preferred that an application agent or installer "front end" is used as an interface between the network data base and the end user. The front end will query the personal computer for its uniquely identifiable information, and then query the data base for the applications software license to this computer, verifying the correct end user. The software applications that are licensed and that can be installed on a computer are identified through the user in the front end interface. The user is then able to select and install the application by downloading from the network server. The use of scripted installation routines allows for standardized installation and requires no end user input or intervention.

The present invention may be embodied as a computer program product stored on a program storage device. The program storage devices of the present invention may be devised, made and used as a component of a machine utilizing optics, magnetic properties and/or electronics to perform the method steps of the present invention. Program storage devices include, but are not limited to, magnetic disks or diskettes, magnetic tapes, optical disks, Read Only Memory (ROM), floppy disks, semiconductor chips and the like. A computer readable program code means in known source code may be employed to convert the methods described below for use on a computer. The computer program or software incorporating the process steps and instructions described further below may be stored in both the end user or client computer(s) and network computer or server.

FIG. 1 illustrates the overall configuration of the method and system of the present invention. Network 20 which may be the Internet or a typical office intra-net system that connects various network servers to various end user personal computers. As shown, network server A, 31, and network server B, 32, are connected via standard wire or wireless connections 21 and 22, respectively, to network 20. Likewise personal end user computer (PC) 1, 41, personal end user computer 2, 42 and personal end user computer 3, 43, are connected by wire or wireless connections 23, 24 and 25, respectively, to network 20.

The network computer or server 31 (FIG. 2) incorporates or has access to one or more program storage devices 35. Installed on the program storage devices are the program license manager 50, discussed further below, database 50a, as well as a plurality of software AA, AB, AC, and the like which are available for license and installation on end user computers. Although this software AA, AB, AC and the like are preferably programs to be downloaded installed and executed by the end user computers, they may also comprise other software such as database information.

The database 50a in the program storage 35 accessed by the network server contains a list of unique identifiers indicating the end user computers which are licensed to install and use the software on the network computer. Matched to each unique end user identifier is a list of the individual software for which that end user computer is licensed.

Figure 3:
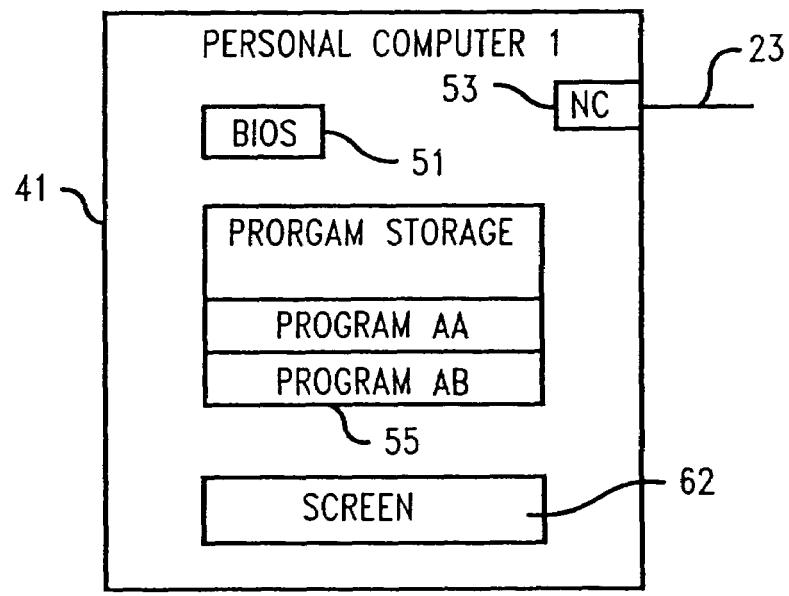
FIG. 3 is a schematic of a typical end user personal computer served by the present invention incorporating licensed software programs and a computer identifier.
Figure 4:
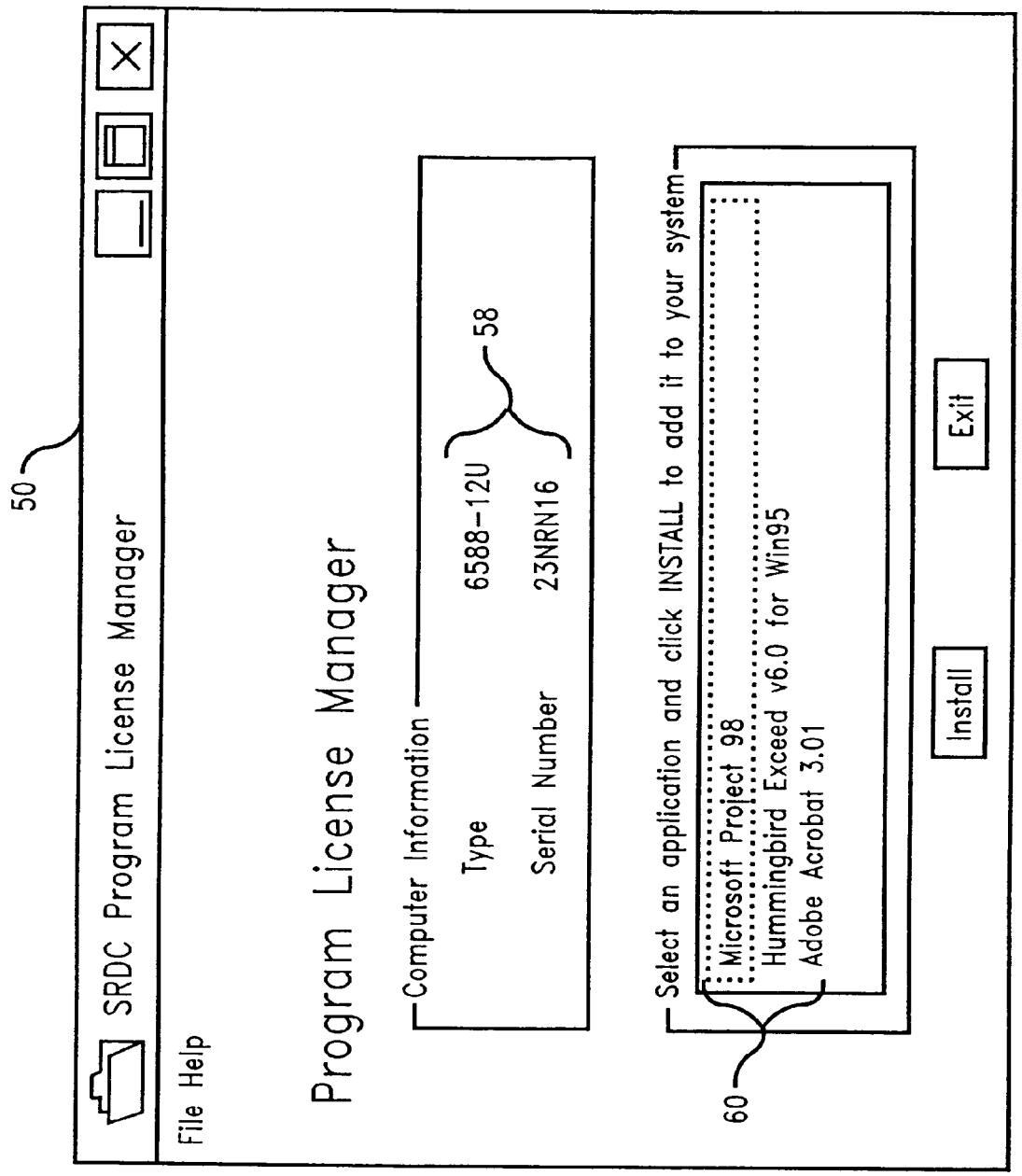
FIG. 4 is a screen view of the preferred program license manager as run on the network server and viewed on the end user personal computer.

FIG. 3 shows a typical client end user personal computer 41 which contains a network card of adapter 53 for connecting the personal computer through connection 23 to network 20. The personal computer also contains in the BIOS a unique identifier containing information as to the type and serial number of the personal computer. This end user computer identifier is unique to that computer and distinguishes it from all other end user personal computers on the network. Personal computer 41 also contains program storage 55 which is able to receive and store various software such as executable programs AA, AB and the like for viewing on screen 62.

The end user personal computer initiates the process by sending a command to the network computer to run the program license manager from the network computer and view it on the screen of the personal computer. The preferred program license manager 50 is run on the network server and is used as the interface with the end user and is viewed on the end user personal computer screen. The program licensed manager preferably contains software to determine the unique end user computer identifier on each of the personal computers which request installation of software on a network computer. A Microsoft Visual Basic application preferably is included in the program license manager to check the vital product data (VPD) area of the personal computer system BIOS for the unique computer type and serial number. Alternatively, the network adapter address may also be utilized for the unique computer identifier. The program license manager then displays the unique end user computer identifier 58 on the end user's computer screen. At the same time, the program license manager queries database 50a on the network server for the software which is licensed to the particular end user computer, and then lists all such software 60 on the end user's screen. The end user then selects the one or more particular software which the end user wishes to install on the end user personal computer. Such software may be for first time installation on the computer. Alternatively, if the software had been already installed on the end user personal computer but became damaged, the end user may select the same software for reinstallation to correct the damaged software on the personal computer. After selecting the desired one or more software, the user then uses a standard mouse-driven cursor interface to click the install button on the program license manager interface 50 on personal computer screen 62. The network server then proceeds to download the selected software through network 20 and into program storage 55 of the personal computer. After installation, the selected software is then physically present in the personal computer storage and ready to run and execute on the personal computer.

Figure 5:
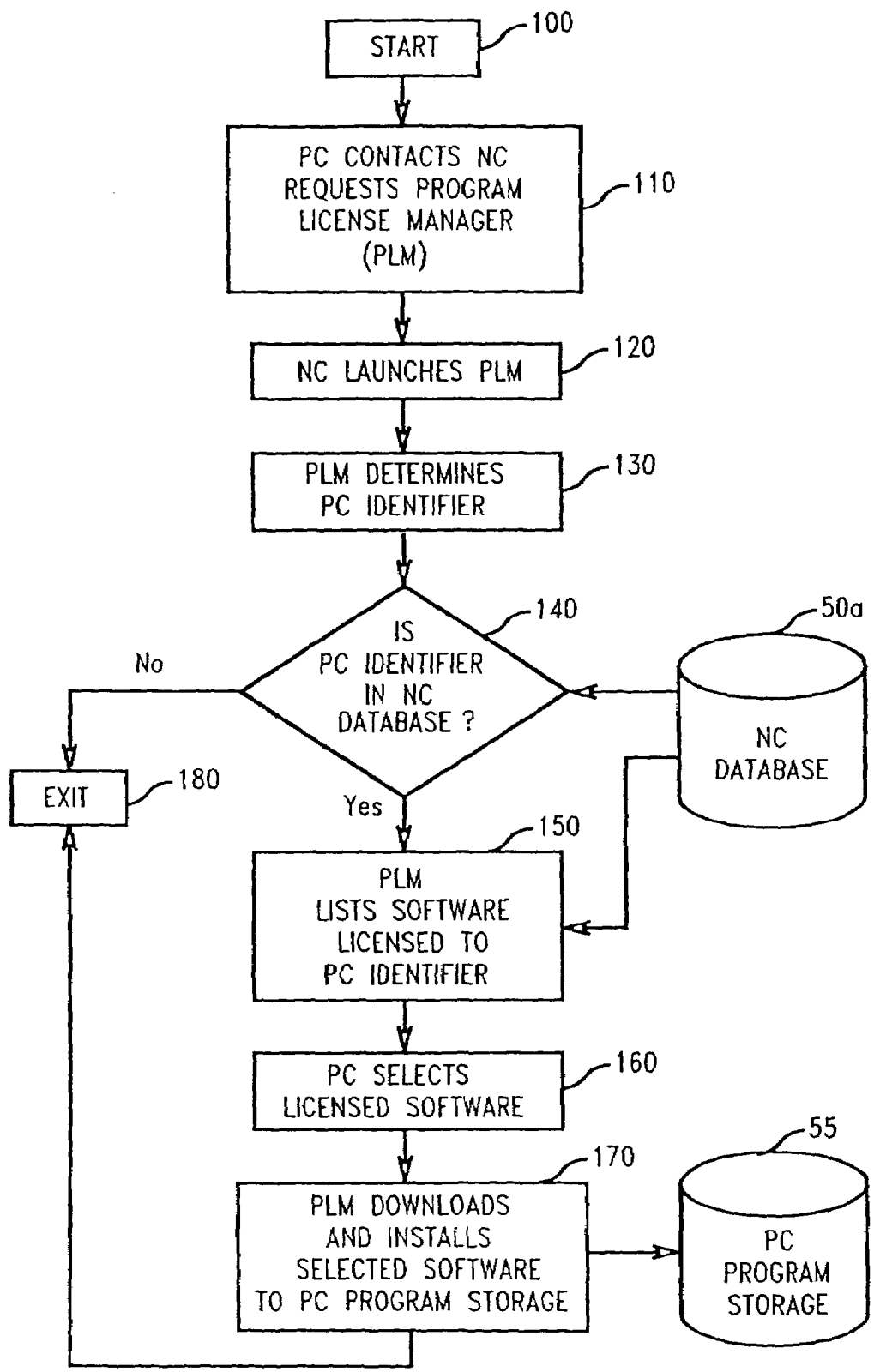
FIG. 5 is a process flow diagram of the preferred method of practicing the present invention.

FIG. 5 illustrates a process flow diagram for the preferred method of the present invention. After start 100, the end user personal computer contacts the network computer and requests the program license manager (PLM) 110. The network computer then launches the PLM, 120, and the PLM determines the personal computer identifier, 130. The network computer then determines whether the personal computer identifier is listed in the network computer data base 140 by querying network computer data base 50a. If the personal computer identifier is listed in the network computer database as being licensed for certain software, the program license manager then lists the software licensed to the personal computer identifier, 150. If the network computer database does not list any licensed software for the personal computer identifier, the program then exits, 180. Continuing on, if the PLM lists licensed software, the personal computer then selects the licensed software desired to be installed 160. The PLM then downloads and installs the selected software to the personal computer program storage, 170, in the personal computer program storage device 55.

The present invention provides advantages over other prior art approaches. The prior art systems may monitor the usage but do not allow for the central control of the installation of licensed software. Also the method of the present invention requires no additional software to be installed and run on the end users personal computer. The front end program license manager application can be run from the network drive and shared with the end user personal computer only when needed, and no installation on the individual personal computer is required. A particular advantage of the present invention is that the software to be installed is never present on the end user computer in a form in which it might be transferred and installed on another personal computer. Instead, the installation media is in the control of the network computer which directly installs the program to the end user computer.

By only allowing end users to install licensed software using the method and system described above, it is easier to manage licensed applications and to comply with legalities concerning use of licensed applications. The end user does not physically have the installation media for the selected software; instead, it is held in the central location of the network server and the software is installed via the network. Control of the installation media in the network server itself makes licensed compliance easier as the media cannot be used by end users without a proper license. Further, standardized installations from the network server reduce support problems and costs. In the case of disaster recovery, system reconfiguration after such recovery of a system upgrade can be done by the end user to reinstall the applications. This reduces the need for system support personnel installing licensed applications while still maintaining license compliance.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of installing licensed software on an end user's computer comprising:
   providing an end user computer having a program storage device and a unique computer identifier distinguishing the end user computer from other computers, the unique computer identifier being selected from the group consisting of a BIOS serial number and a network adapter address;
   providing a network computer having access to a program storage device containing software selected from the group consisting of programs to be executed by the end user's computer and database information for license to end users and a program storage device containing a database listing computer identifiers licensed to run the software;
   using the network computer to contact the end user computer and determine its end user computer identifier;
   verifying listing of the end user computer identifier in the network computer database;
   based on the verification that the end user computer identifier is listed in the network computer database, downloading said software from the network computer program storage device; and
   using the network computer, installing the downloaded software on the end user computer program storage device such that the downloaded and installed software is not in a form that may be transferred from the end user computer and installed on another computer.

2. The method of claim 1 wherein on installation on the end user computer program storage device, the software comprises a program for execution on the end user computer.

3. The method of claim 1 wherein the network computer includes a plurality of different software and, prior to downloading the software, further including:
   identifying to the end user computer all of the software on the network computer program storage device listed as licensed by the computer identifier of the end user computer; and
   sending from the end user computer to the network computer a selection of the software to be downloaded; and thereafter downloading and installing on the end user computer program storage device the selected software.

4. The method of claim 3 wherein the identification to the end user computer of all the software on the network computer program storage device listed as licensed by the computer identifier of the end user computer is by an executable program on a program storage device of the network computer.

5. The method of claim 4 wherein prior to identifying to the end user computer the software on the network computer program storage device, further including:
   sending to the network computer, from the end user computer, a command to run the program identifying to the end user computer the software listed as licensed by the computer identifier of the end user computer.

6. The method of claim 5 wherein the program identifying to the end user computer the software listed as licensed by the computer identifier is not installed on the end user computer.

7. The method of claim 1 wherein the end user computer program storage device contains a damaged version of the software to be downloaded, and wherein the installation of said software corrects the damaged software.

8. A method of installing licensed software on an end user's computer comprising:
- providing an end user computer having a program storage device and a unique computer identifier distinguishing the end user computer from other computers, the unique computer identifier being selected from the group consisting of a BIOS serial number and a network adapter address;
- providing a network computer having access to a program storage device containing a plurality of different software for license to end users, the software comprising programs for execution on end user computers, and a program storage device containing a database listing computer identifiers licensed to run the software;
- using the network computer to contact the end user computer and determine its end user computer identifier;
- verifying listing of the end user computer identifier in the network computer database;
- identifying to the end user computer all of the software on the network computer program storage device listed as licensed by the computer identifier of the end user computer;
- sending from the end user computer to the network computer a selection of said software to be downloaded;
- downloading the selected software from the network computer program storage device; and
- using the network computer, installing the downloaded software on the end user computer program storage device for execution on the end user's computer such that the downloaded and installed software is not in a form that may be transferred from the end user computer and installed on another computer.

9. The method of claim 8 wherein the identification to the end user computer of all the software on the network computer program storage device listed as licensed by the computer identifier of the end user computer is by an executable program on a program storage device of the network computer.

10. The method of claim 9 wherein prior to identifying to the end user computer the software on the network computer program storage device, further including:
- sending to the network computer, from the end user computer, a command to run the program identifying to the end user computer the software listed as licensed by the computer identifier of the end user computer.

11. A method of installing licensed software on an end user's computer comprising:
- providing an end user computer having a program storage device containing a damaged executable software program for execution on the end user's computer and a unique computer identifier distinguishing the end user computer from other computers, the unique computer identifier being selected from the group consisting of a BIOS serial number and a network adapter address;
- providing a network computer having access to a program storage device containing software for installing said executable software program and a program storage device containing a database listing computer identifiers licensed to run the software;
- using the network computer to contact the end user computer and determine its end user computer identifier;
- verifying listing of the end user computer identifier in the network computer database;
- based on the verification that the end user computer identifier is listed in the network computer database, downloading said software from the network computer program storage device; and
- using the network computer, installing the downloaded software on the end user computer program storage device and correcting the damaged executable software program for execution on the end user's computer such that the downloaded and installed software is not in a form that may be transferred from, the end user computer and installed on another computer.

12. The method of claim 11 wherein the network computer includes a plurality of different software and, prior to downloading the software, further including:
- identifying to the end user computer all of the software on the network computer program storage device listed as licensed by the computer identifier of the end user computer; and
- sending from the end user computer to the network computer a selection of the software to be downloaded; and thereafter downloading and installing on the end user computer program storage device the selected software.

13. The method of claim 12 wherein the identification to the end user computer all of the software on the network computer program storage device listed as licensed by the computer identifier of the end user computer is by an executable program on a program storage device of the network computer.

14. The method of claim 13 wherein prior to identifying to the end user computer the software on the network computer program storage device, further including:
- sending to the network computer, from the end user computer, a command to run the program identifying to the end user computer the software listed as licensed by the computer identifier of the end user computer.

15. A program storage device readable by a machine, tangibly embodying a program of instructions executable by the machine to perform method steps for installing licensed software from a network computer to an end user's computer, said network computer having access to a program storage device containing software selected from the group consisting of programs to be executed by the end user's computer and database information for license to, end users and a program storage device containing a database listing computer identifiers licensed to run the software, said end user computer having a program storage device and a unique computer identifier distinguishing the end user computer from other computers, the unique computer identifier being selected from the group consisting of a BIOS serial number and a network adapter address, said method steps comprising:
- contacting the end user computer using the network computer;
- determining the end user computer identifier;
- verifying listing of the end user computer identifier in the network computer database;
- based on the verification that the end user computer identifier is listed in the network computer database, downloading said software from the network computer program storage device; and
- using the network computer, installing the downloaded software on the end user computer program storage device such that the downloaded and installed software is not in a form that may be transferred from the end user computer and installed on another computer.

16. A computer program product for use with a network computer and an end user's computer, said computer program product comprising a computer usable medium having computer readable program code means embodied in said medium for installing licensed software from the network computer to the end user's computer, said network computer having access to a program storage device containing software selected from the group consisting of programs to be executed by the end user's computer and database information for license to end users and a program storage device containing a database listing computer identifiers licensed to run the software, said end user computer having a program storage device and a unique computer identifier distinguishing the end user computer from other computers, the unique computer identifier being selected from the group consisting of a BIOS serial number and a network adapter address, said computer program product having:

computer readable program code means for contacting the end user computer using the network computer;
  computer readable program code means for determining the end user computer identifier;
  computer readable program code means for verifying listing of the end user computer identifier in the network computer database;
  computer readable program code means for downloading said software from the network computer program storage device based on the verification that the end user computer identifier is listed in the network computer database; and
  computer readable program code means for using the network computer to install the downloaded software on the end user computer program storage device such that the downloaded and installed software is not in a form that may be transferred from the end user computer and installed on another computer.

17. An article of manufacture comprising: a computer usable medium having computer readable program code means embodied therein for installing licensed software from a network computer to an end user's computer, said network computer having access to a program storage device containing software selected from the group consisting of programs to be executed by the end user's computer and database information for license to end users and a program storage device containing a database listing computer identifiers licensed to run the software, said end user computer having a program storage device and a unique computer identifier distinguishing the end user computer from other computers, the unique computer identifier being selected from the group consisting of a BIOS serial number and a network adapter address, the computer readable program code means in said article of manufacture comprising:

computer readable program code means for contacting the end user computer using the network computer;
  computer readable program code means for determining the end user computer identifier;
  computer readable program code means for verifying listing of the end user computer identifier in the network computer database;
  computer readable program code means for downloading said software from the network computer program storage device based on the verification that the end user computer identifier is listed in the network computer database; and
  computer readable program code means for using the network computer to install the downloaded software on the end user computer program storage device such that the downloaded and installed software is not in a form that may be transferred from the end user computer and installed on another computer.

* * * * *